(12) United States Patent
Black

(10) Patent No.: US 6,554,308 B2
(45) Date of Patent: Apr. 29, 2003

(54) RECUMBENT VEHICLE & APPARATUS FOR FORMING SAME

(75) Inventor: James G. Black, Burnsville, MN (US)

(73) Assignee: Blackbird Designs Inc., Burnsville, MN (US)

( * ) Notice: Subject to any disclaimer, the term of this patent is extended or adjusted under 35 U.S.C. 154(b) by 0 days.

(21) Appl. No.: 09/860,748

(22) Filed: May 18, 2001

(65) Prior Publication Data

US 2002/0014755 A1 Feb. 7, 2002

Related U.S. Application Data

(60) Provisional application No. 60/205,339, filed on May 18, 2000.

(51) Int. Cl.[7] .............................................. B62K 13/06
(52) U.S. Cl. .................. 280/231; 280/209; 280/288.1; 280/267
(58) Field of Search ................................ 280/231, 230, 280/288.1, 267, 278, 282, 209; D12/109

(56) References Cited

U.S. PATENT DOCUMENTS

| | | | |
|---|---|---|---|
| 437,026 A | * | 9/1890 | Flachs |
| 442,275 A | * | 12/1890 | Rothgiesser |
| 3,592,486 A | * | 7/1971 | Fox ............................. 280/209 |
| 3,713,671 A | * | 1/1973 | Boyer ......................... 280/202 |
| 3,794,352 A | | 2/1974 | Popp .......................... 280/209 |
| 3,836,175 A | | 9/1974 | Pomerance et al. ......... 280/209 |
| 3,857,583 A | | 12/1974 | Vanover ...................... 280/282 |
| 3,865,401 A | | 2/1975 | Kingsly ....................... 280/209 |
| 3,902,738 A | | 9/1975 | Gandrud ...................... 280/209 |
| 3,938,827 A | | 2/1976 | Johnson ...................... 280/209 |
| 4,093,258 A | | 6/1978 | Ansel .......................... 280/231 |
| 4,227,589 A | | 10/1980 | Chika .......................... 180/206 |
| 4,288,089 A | * | 9/1981 | Thiessen ..................... 280/209 |
| 4,834,410 A | | 5/1989 | Parker ......................... 280/209 |
| 4,925,203 A | | 5/1990 | Buckler ....................... 280/278 |
| 5,342,074 A | | 8/1994 | Amdahl et al. ............. 280/209 |
| 5,511,809 A | | 4/1996 | Sagi ............................ 280/209 |
| 5,584,494 A | | 12/1996 | Krumm .................... 280/288.1 |
| D385,225 S | | 10/1997 | Challoner et al. ......... D12/109 |
| 5,853,062 A | | 12/1998 | Hulett ......................... 180/206 |
| D408,761 S | | 4/1999 | Challoner et al. ......... D12/109 |
| 5,951,034 A | | 9/1999 | Mayo ...................... 280/288.1 |
| 6,022,036 A | * | 2/2000 | Chartrand ................... 280/209 |
| 6,068,278 A | * | 5/2000 | Kock et al. ................. 280/209 |
| 6,109,391 A | * | 8/2000 | Tyson ......................... 182/117 |
| 6,381,777 B1 | * | 5/2002 | Mitchell ..................... 5/236.1 |

* cited by examiner

*Primary Examiner*—Avraham Lerner
(74) *Attorney, Agent, or Firm*—Nawrocki, Rooney & Sivertson, P.A.

(57) ABSTRACT

A recumbent vehicle including parallel paired recumbent bicycles operatively and reversibly joined by a bracing assembly having less than four brace members, is provided. The parallel paired recumbent bicycles are easily separable, without the need for tools, for individual riding. A conversion kit for reversibly uniting a pair of recumbent bicycles so as to form a recumbent quad is similarly provided. The kit generally includes a bracing assembly including a pair of braces, and brackets adapted to reversibly receive portions of the braces therein. One of the brackets is a front bracket with another of the brackets being a rear bracket. The front bracket is supported by a front triangle of a diamond frame of the recumbent bicycle, with the rear bracket being supported by a rear triangle of the diamond frame.

14 Claims, 9 Drawing Sheets

RECUMBENT VEHICLE & APPARATUS FOR FORMING SAME

This is a regular application filed under 35 U.S.C. §111(a) claiming priority under 35 U.S.C. §119(e)(1), of U.S. provisional application Ser. No. 60/205,339 having a filing date of May 18, 2000, filed under 35 U.S.C. §111(b).

TECHNICAL FIELD

The present invention generally relates to pedal powered vehicles, more particularly to a side-by-side, multi-rider recumbent vehicle, the manufacture/assembly thereof, and, apparatus for quickly and efficiently joining parallelly paired recumbent bicycles so as to form the subject multi-rider recumbent vehicle.

BACKGROUND OF INVENTION

Heretofore, many pedal powered vehicles have been produced to accommodate multiple riders. One such vehicle is known commonly as a tandem bicycle, wherein one rider sits in front of another rider, each rider having pedals for powering the vehicle, the front rider being provided with a handlebar adpated to steer the vehicle. The shortcomings of this arrangement are well know, being summarized in U.S. Pat. No. 5,342,074 issued to Amdahl et al. and others.

A favored configuration for pedal powered vehicles capable of carrying more than one person is dual side-by-side (i.e., parallel arrangement). Bicycles so configured, whether they comprise conjoined individual frames or a "single" frame designed exclusively for such purposes, provide a more stable vehicle, in contrast to the tandem, enjoyable by those who lack confidence in their sense of balance, or who, for other reasons (e.g., handicap, age, infirmity, etc.), are not able to ride a standard bicycle. Furthermore, side-by-side arrangements can be useful for certain types of physically challenged individuals who may require supervision and/or assistance, so that vehicles so arranged can serve a rehabilitation function. Aside from the known benefits accruing from the side-by-side configuration, the sociability afforded by such a configuration makes such vehicles fun to ride, and highly desirable.

Up-right side-by-side vehicles, and/or the many devices produced for connecting a pair of up-right bicycles together in a side-by-side relationship, are known to have numerous drawbacks. While the balance and general stability of these vehicles is much greater than a bicycle, the center of gravity for these vehicles is rather high since the riders sit upright upon a saddle. This fact greatly contributes to greater stresses being placed on the cross bracing, components which, more often than not, are permanent, or, if nothing else, difficult and cumbersome to remove so as to separate the bicycles of the vehicle so that each may be used independently.

Whereas most of today's bicycles are of a conventional sit-up design, numerous attempts have been made to introduce recumbent bicycle designs. The recumbent bicycle is generally longer than a conventional sit-up bicycle, positioning a rider lower with respect to the ground, and is generally characterized by the rider sitting slightly reclined in a high-backed seat. The recumbent bicycle provides increased comfort, greater pedal efficiency, and a lower center of gravity when compared to the conventional sit-up bicycle. At present, single rider recumbent bicycles styles are generally characterized by their wheel base length: long wheel base (65–71"); short wheel base (33–45"); and, compact long wheel base (46–64"), with each style offering specific handling characteristics consistent with its frame configuration.

Although the benefits accruing to recumbent bicycles are likewise realized in a paired union of recumbent bicycles, there remains obstacles not unique to such vehicles. For instance, difficulty remains in achieving easy, effective steering of bicycles connected to form a side-by-side pedal powered vehicle. Some such vehicles do not couple the steering systems for each of the independent bicycles, making a great deal of cooperation between the two riders necessary so as to safely direct and otherwise maneuver the vehicle. Although the use of tie-rods and other coupling mechanisms are known to join the handlebars together so that either rider can steer both bicycles when they are joined as a unit, responsiveness has been less than optimal, with such coupling assemblies often times being extreme in a mechanical sense: overly simple, offering only minimal effectiveness, or very complex, making separability of the individual bicycles for independent use a labor intensive task, better suited for the shop, not the trail head.

Further still, in use, the bicycles of known side-by-side multi-rider vehicles are separately subject to a variety of ground obstacles (e.g., speed bumps, pot holes, rocks, sticks, etc.), which result in the application and distribution of disproportionate torquing forces to components of the vehicle, as well as the vehicle in its entirety. An individual bike of the pair may similarly strike an object such as a curb, and the other not, their momentum producing a raking force which tries to carry one bicycle ahead farther than the other. Some or all of such forces may be encountered in random combination, thereby diminishing the structural integrity of the side-by-side vehicle, particularly the bracing structures thereof.

SUMMARY OF THE INVENTION

A recumbent vehicle, the manufacture thereof, and apparatus for forming same, is provided. The recumbent vehicle generally includes a pair of recumbent bicycles (i.e., companion bicycles), each of which preferably but not necessarily has a suspension assembly for at least partially suspending a ground engaging wheel thereof, interconnected in side-by-side relation. The frame of the recumbent bicycles are structurally joined using a bracing assembly having a pair of cross braces which link the frames in forward and rearward positions so as to constrain the companion bicycles in six degrees of motion: pitch, roll, yaw, lateral side to side, lateral for and aft, and lateral up and down. The companion bicycles are further united in a functional way by a steering coupling assembly to produce an Ackermann geometrically correct steering mechanism for the recumbent vehicle.

The parallel paired recumbent bicycles of the subject invention each preferably include a frame having front and rear triangles, hallmarks of the traditional diamond frame. In one embodiment a BMX frame is adapted for recumbent riding (i.e., converted), and is paired with a like-styled recumbent. In an alternate embodiment, more traditional recumbent bicycles are pairingly integrated using the kit of the subject invention which generally includes a two point bracing assembly and a steering coupler assembly. More specific features and advantages obtained in view of those features will become apparent with reference to the drawing figures and DETAILED DESCRIPTION OF THE INVENTION.

DETAILED DESCRIPTION OF THE INVENTION

Figure 1:
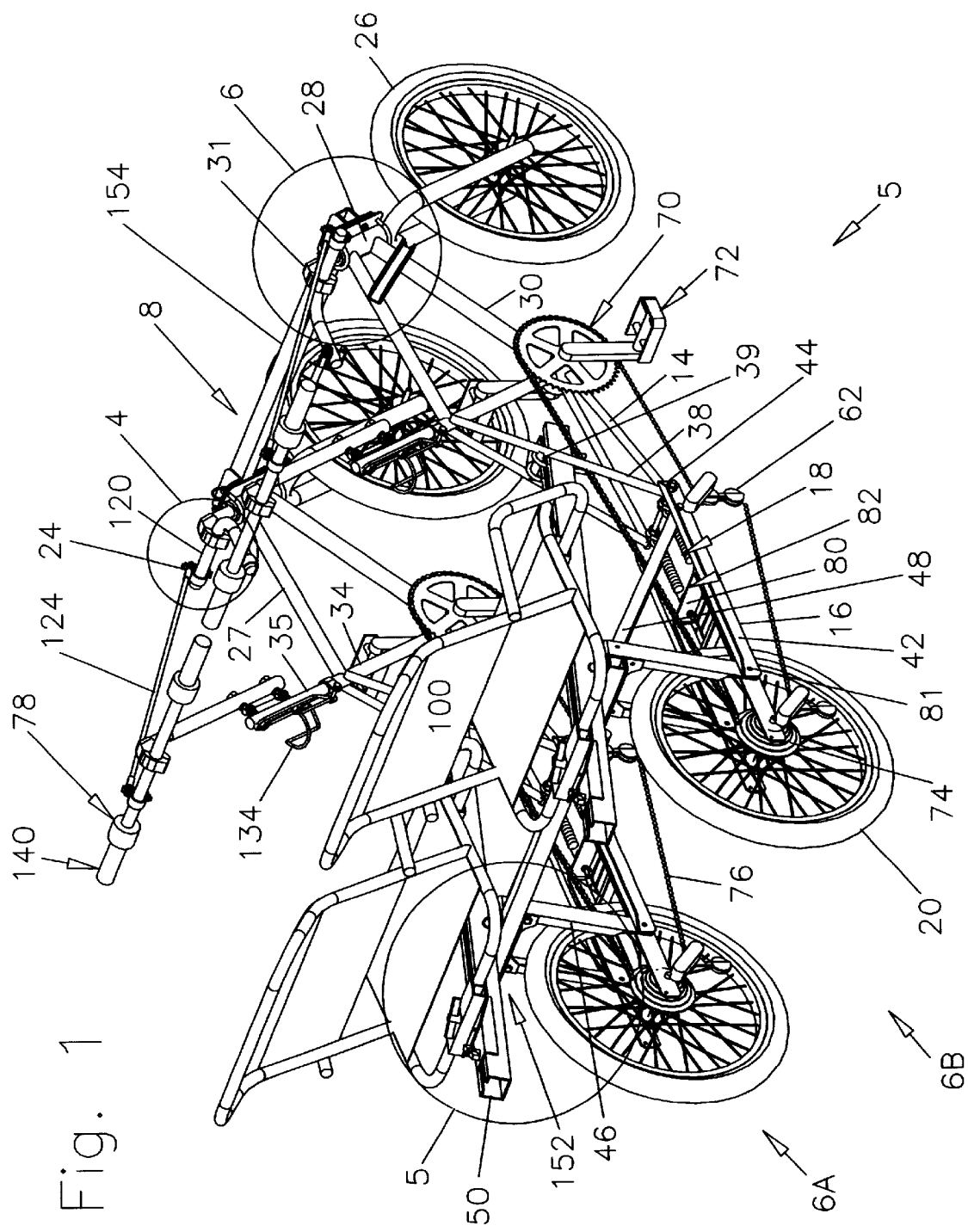
FIG. 1 is a right side perspective view of the subject invention from slightly above and to the rear.
Figure 2:
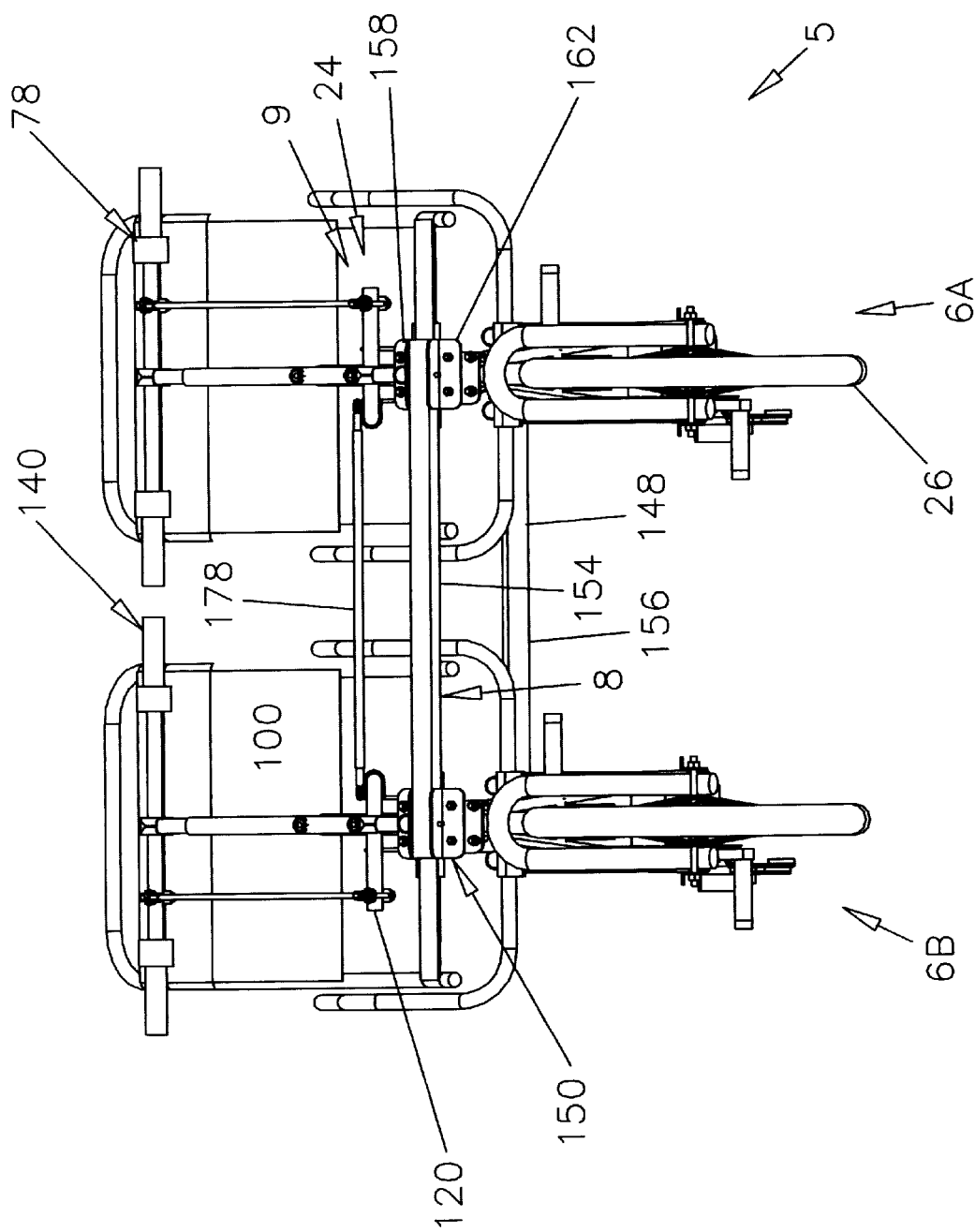
FIG. 2 is a front perspective view thereof shown from slightly above.
Figure 3:
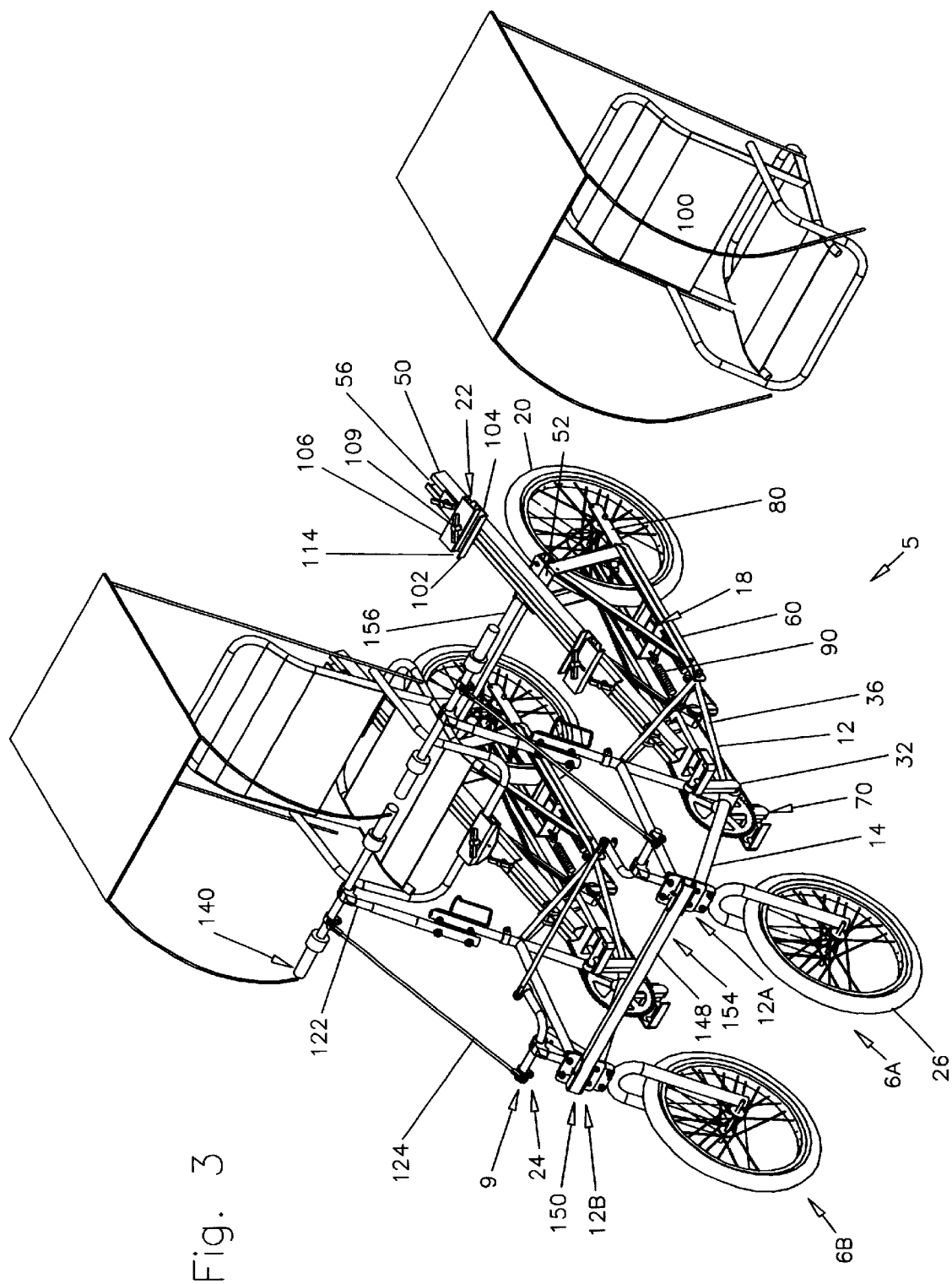
FIG. 3 is a left side perspective view thereof shown from slightly above and from the front.

As shown generally in FIGS. 1–3, a recumbent vehicle 5 is provided comprising a pair of recumbent bicycles 6a, 6b, preferably but not necessarily of a style disclosed in applicant's copending application Ser. No. 09/573,754 entitled "Recumbent Bicycle & Apparatus for Forming Same," filed May 18, 2000 and incorporated herein by reference, interconnected in side-by-side relationship by a bracing assembly 8 which reversibly unites the frames thereof, and, a steering coupler assembly 9 for integrating the steering mechanisms of the bicycles so they operate, not only in unison, but with geometrically correct steering. The recumbent vehicle of the subject invention is likewise shown in FIG. 7 wherein the parallel paired recumbent bicycles of the vehicle are of a commercial available style, as will be later detailed.

Referring now generally to FIGS. 1–6, and more particularly FIGS. 1–3, the recumbent bicycles of the dual recumbent vehicle are each capable of being independently operated whenever they are not interconnected by the brace members, and their steering mechanisms joined by the steering coupler (i.e., are easily separable from the vehicle configuration). Each of the recumbent bicycles are identically equipped and configured, the only difference between them being the orientation of the steering bends carried by the stems of each of the companion bicycles, as is best seen in FIG. 2. For reasons that will be later explained, it is advantageous that the steering bends be oppositely oriented (i.e., each of the steering bends "bending" or "sweeping" away from the companion bicycle as shown in FIG. 2).

As each of the recumbent bicycles are essentially identical, discussion hereinafter will be limited to the construction of bicycle 6a. One skilled in the art will appreciate that the components detailed in relation to bicycle 6a would similarly be found on bicycle 6b. Furthermore, although a specific discussion as to the features of bicycle 6a follows, it is to be understood that the particulars thereof, namely structures, components, their interrelationships, etc., are considered well within the skill of the ordinary artisan. It is only essential that a recumbent vehicle be formed by the union of discrete recumbent bicycles.

Hereinafter, the "forward" direction relates to the direction which the vehicle travels when in operation (i.e., generally in the direction proceeding from the rear wheel to the front wheel), with the "rear" direction opposite thereto. The "left" side of the vehicle is with respect to the left side of a rider when seated in operating position, with the "right" side being with respect to the right side of such rider.

With continued general reference to FIGS. 1–3, the recumbent bicycles 6a and 6b of the subject invention generally includes a frame 12 having joined forward 14 and rearward 16 portions, a suspension assembly 18 for pivotably supporting a rear ground engaging wheel 20, a seat mounting assembly 22, and a steering mechanism 24.

The front frame portion 14 generally comprises a sit-up bicycle frame (e.g., a "diamond" frame (i.e., one having a front triangle from which extends a rear triangle)) having a head tube 28, down tube 30, bottom bracket 32, seat tube 34 (these elements traditionally defining the front triangle), chainstay 36, seatstay 38, and dropouts 40 (these elements traditionally defining the rear triangle), with all known tube construction materials (e.g., steel, chrome/molybdenum, aluminum, carbon fiber, etc.) being suitable, and not necessarily critical, for present purposes. Although the front frame portion is generally configured consistent with the traditional diamond frame, alternate sit-up frame configurations (e.g., the "ladies" frame or the mixte frame) are suitable and readily adaptable for present purposes.

The body 14 of the recumbent bicycle frame 12 is preferably a BMX (i.e., bicycle moto-cross) style frame, as its aggressive geometry offers excellent strength and stability, generally providing a squat frame with head angles ranging between about 68 to 78 degrees, seat angles in the range of about 68 to 74 (or more) degrees, chainstays of up to about 18 inches, and a bottom bracket height usually from about 10.75 to 13 inches. Such arrangement of frame components greatly contribute to a sound mechanical posture for a rider of the recumbent bicycle of the present invention.

As will be better appreciated as this description proceeds, the selection and incorporation of a sit-up bicycle frame, as well as other select components, in the recumbent bicycle of the present invention, whether BMX, mountain bike, mixte, etc., provides at least a two fold advantage: first, a fundamentally strong, stable, responsive, and proven rider support structure; and two, a cost-effective, highly attractive alternative to a custom frame. As a matter of fact, the forward frame portion of the subject recumbent bike (i.e., the diamond frame) is readily available at no, or little cost, such component need not be new.

The rearward frame portion 16 of the recumbent frame 12 includes: a supplemental chainstay 42 joined at one end by a dropout rod 44, primary 46 and secondary 48 seatstays upwardly extending from the supplemental chainstay 42, and a top tube 50, supported indirectly by the seatstays 46, 48, adapted to adjustably receive the seat mounting assembly 22. The primary 46 and secondary 48 seatstays, in combination with the supplemental chainstay 42, form the rearward most structural member (i.e., triangle) for the recumbent frame 12. The primary seatstay 46 extends upwardly, and generally forward, from the back end of the supplemental chainstay 42, with the secondary seatstay 48 extending upward, and generally rearward, from a point near the front end of the supplemental chainstay 42. The primary 46 and secondary 48 seatstays are in turn joined together, terminating at a rear top tube mount 52 to which the top tube 50 of the rearward frame portion 16 is attached.

The top tube 50, as best seen in FIG. 3, is generally configured as a channeled member, for instance a box beam or the like. The upper surface 54 of the top tube 50 is grooved substantially throughout its length, so as to receive components of the seat mounting assembly 22, and permit travel there along. More particularly, the groove or slot 56 in the top surface 54 of the top tube 50 defines a pair of channel flanges 58 which cooperatively engage a portion of the seat mounting assembly 22, as will be detailed later. Preferably, but not necessarily, the top tube 50 has at least one "open" end so as to at least initially receive at least a portion of the seat mounting assembly 22. The top tube is suitable adapted to carry items such as a reflector, mud flaps, etc.

As to the general relationship between the frame portions, the rearward frame portion 16 is generally joined to the forward frame portion 14 such that the supplemental chainstay 42 rearwardly extends from the dropouts 40 of the forward frame portion 14 so as to be a substantial continuation or extension of the chainstay 36 of the forward frame portion 14. The dropout rod 44, which forms a closed end for the supplemental chainstay 42, is reversibly received in the dropouts 40 of the sit-up frame 14, and secured therebetween in a known manner. By this construction and arrangement, an elongated chainstay 60 is thereby formed for the frame of the recumbent bicycle. A supplemental chain tensioner 62 is suspended from the "chain side" of the elongated chainstay 60, so as to minimize unwanted slack in the chain of the drive assembly.

The top tube 50, which is substantially supported by the rearward most frame triangle, is further supported by the forward frame portion 14 of the recumbent frame 12, namely at a linkage thereto. The top tube 50 is preferably joined to the forward frame portion 14 at the seatstay spreader 39 thereof, as by the use of "U"-bolts 64 or the like, which permit suspension of the top tube 50 therefrom, as shown in FIG. 1. As the bend of the U-bolt 64 snugly embraces the seatstay spreader 39 of the forward frame portion 14, a segment of polyethylene tubing 65 is provided about the bend to generally prevent direct contact therebetween, thus protecting the surface finish of the spreader 39.

The drive assembly 70 for the recumbent bicycles 6a and 6b operate to enable a rider to propel the bicycle. It is preferable that such a drive assembly have a free wheel so that the driven wheel is able to rotate without a corresponding rotation in the pedals. It is also preferable to include multiple gears to permit different gearing for different users and riding conditions. It is further preferable that the drive assembly of bicycle 6a not be coupled to the drive assembly of bicycle 6b. This enables users of different physical capability to independently select the amount of effort they wish to provide, and to enable one rider to rest while the other propels the dual recumbent vehicle. The preferred drive assembly includes a pedal assembly 72, a free wheel assembly 74, a chain 76, and a gear shift mechanism 78. With respect to the drive train, it should be understood that modifications in lengths of items such as the chain, cables (e.g., brake and shifting), etc., necessitated by the effective rearward elongation of a conventional sit-up frame of the recumbent bicycle of the present invention, are well within the skill of a person of ordinary skill in the bicycle art, and need not be detailed.

The suspension assembly 18 is shown in FIG. 1 pivotably attached to the rearward frame portion 16 such that the rear ground engaging wheel 20 is vertically responsive to variable ground surface conditions. The suspension assembly 18 includes a swing arm 80 adapted to receive and retain rear ground engaging wheel 20, and a spring assembly 82 for biasing the swing arm 80 about the pivot attachment 81. The spring assembly 82 generally links an end of the swing arm 80, at least indirectly, to the frame body 14.

The swing arm 80 is positioned, relative to the other rearward frame portion elements, to be received between the parallel arms (i.e., tubes) of the supplemental chainstay 42 for attachment thereto. The swing arm 80 generally includes a pair of parallel braces 84 which are spaced apart by a spreader 86. The braces 84 are joined at one end so as to thereby form a "head" 88 for the swing arm 80 (i.e., a closed front end), with the rear wheel 20 being received and retained, in a known manner, at an end opposite the head 88 of the swing arm 80. The swing arm 80 is rotatingly connected, at its braces 84, to the supplemental chainstay 42, more particularly, the braces 84 of the swing arm 80 are connected to the rearward frame portion 16 at the union or interface of the supplemental chainstay 42 and the primary seatstay 46, to thereby define the pivot point 81 for the suspension assembly 18 relative to the frame 12 of each of the recumbent bicycles 6a and 6b.

The spring assembly 82 generally includes a spring 90 or other tensioning element, more preferably a pair of springs, and hardware for suspending same between the swing arm 80 and the drop out rod 44 of the rearward frame portion 16. Although not clearly visible, each spring of the pair preferably has front 92 and rear 94 through buckles. The front through buckle 92 is attached to the dropout rod 44 via an "S" hook, which is fixedly positioned along the length of the dropout rod 44, whereas the rear through buckle 94 is secured to the head 88 of the swing arm 80 by an eye bolt or the like.

It is advantageous that the spring assembly 82 be selectively adjustable to effect frame stiffness, and thereby provide a sought after performance. Towards this end, the springs 90 of the spring assembly 82 are, via the rear through buckle 94, adjustable. The eye bolt which secures the rear through buckle 94, is reversibly extendable relative to the head 88 of the swing arm 80 so as to thereby adjust (i.e., modify) the tension of the spring 90 between relative a maximum and a minimum, such end points being defined largely by the length of the threaded shank of the eye bolt. For example, with the eye portion of the eye bolt minimally extended from the head of the swing arm, a "maximum" tension for the springs results, which in turn provides a "stiff" frame condition. Furthermore, dampening means such as a shock absorber or the like, may be appropriately added to obtain a sought after riding characteristic without departing from the subject matter of the subject invention.

Figure 7:
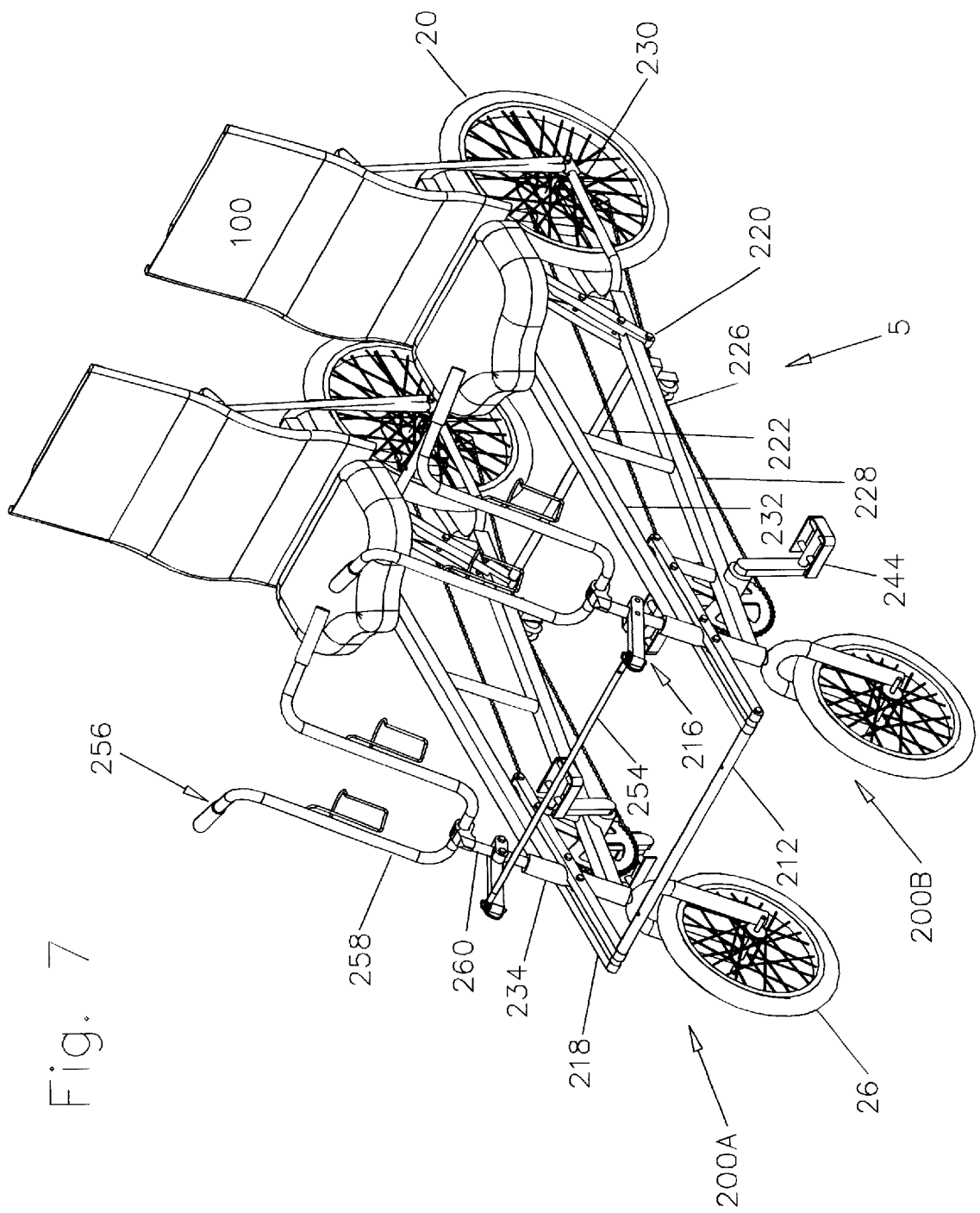
FIG. 7 is a view similar to that of FIG. 3 illustrating commercially available recumbent bicycles joined to form the recumbent vehicle of the subject invention.

As best shown in FIG. 3, a seat mounting assembly 22 is shown for releasably affixing or retaining a chair 100 (i.e., high back seat or the like) to the top tube 50 of the rearward frame portion 16, and for selectively adjusting same therealong, so as to quickly accommodate riders of variable height on either of the recumbent bicycles 6a or 6b. The seat mounting assembly 22 preferably, but not necessarily, includes a pair of identical brackets 102 having channel 104 and chair 106 clamp portions, namely a front and rear bracket for supporting a chair, preferably a beach (i.e., "surf") chair, or other low slung style chair having a frame, and suspended therefrom, back and seat portions. Such chair is preferably adapted to at least partially support a canopy, as shown in FIGS. 3 and 7, for shielding the rider from the elements, most notable the sun and rain. Aside from the obvious benefits associated with riding comfort that such chair affords, this style chair has a particular functionality apart from the bicycle: upon arrival at the beach, park, etc., it is quickly and easily removed for use apart from the bicycle at the destination.

Figure 5:
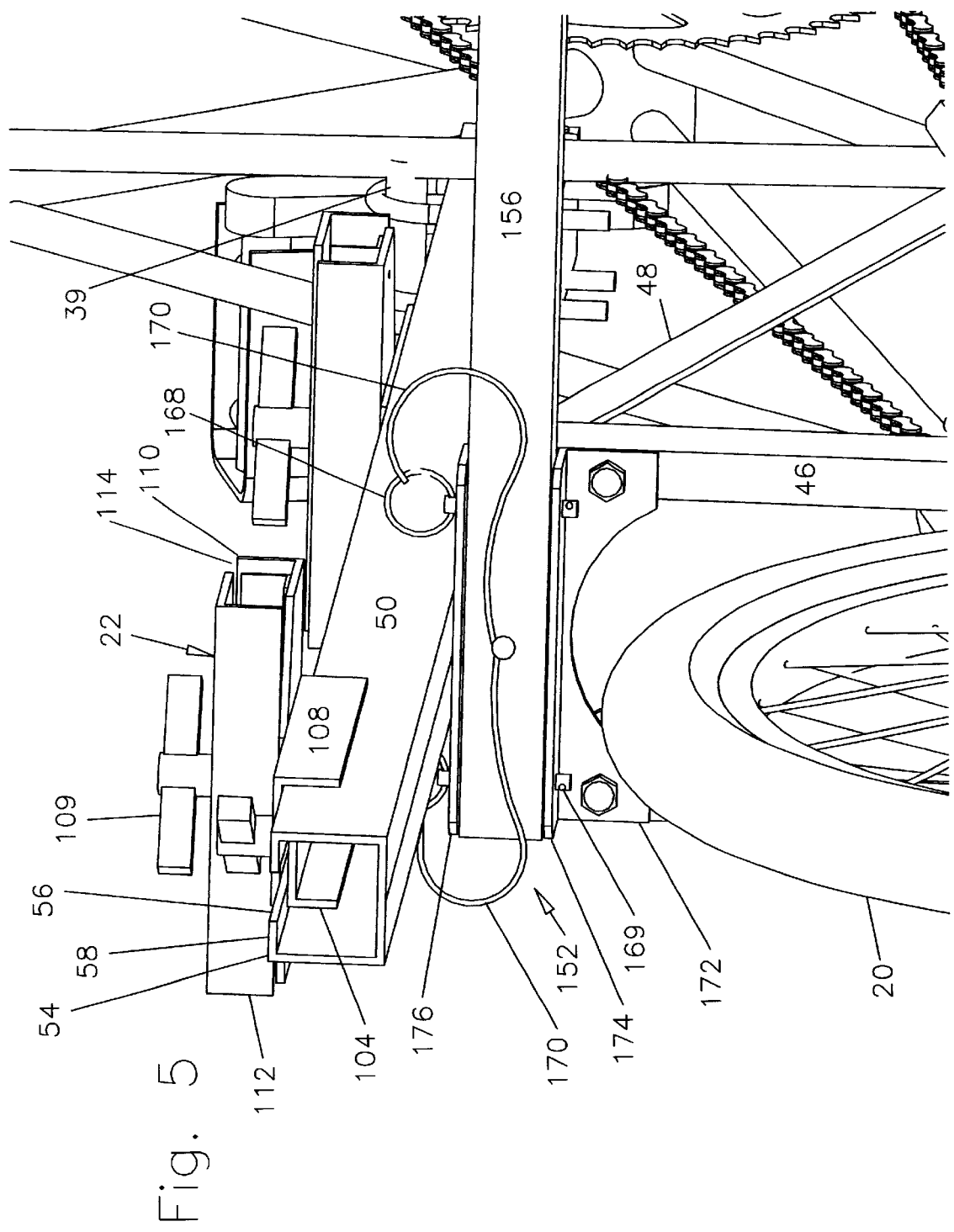
FIG. 5 is a fragmentary perspective detail view thereof showing left rear joining elements shown from the right side and to the rear.

The channel clamp portion 104 of the seat mounting assembly 22 generally includes opposed sliding members 108 (i.e., an upper and lower sliding member) which are arranged (i.e., held in a spaced apart condition) to receive, and adapted to compressioningly grip, the channel flanges 58 of the top tube 50 therebetween. Preferably, a bolt extends upwardly from the underside (i.e., bottom surface) of the lower sliding member and through the upper sliding member. Receivable on the threaded shank of the bolt is an easily rotatable wing nut 109 for urging the upper sliding member 108 into engagement with the channel flanges 58, for clamping the channel clamp 104 to the top tube 50. A spacer, for example a nut, is disposed on the bolt, positioned above the top surface of the lower sliding member, to space apart the sliding members. As best seen in FIG. 5, the upward extending bolt "rides" within the channel 56 when the seat mounting assembly 22 is slidable adjusted on the top tube 50. Other supplemental hardware, such as washers and the like, is used in a traditional way to complete the channel clamp portion 104 of the seat mounting assembly 22.

The chair clamp portion 106 of the seat mounting assembly 22 generally includes a base member 110, adapted to receive a portion of a chair frame, and a chair frame holder 112 supported by the base member 110, and adjustably mounted with respect thereto for clasping down against the portion of the chair frame received in the base member 110. The base member 110 includes a slot 114 for receiving a portion of the chair frame. Such structure is preferably formed by angle irons, for instance, as is shown in FIG. 5, wherein the base member 110, which is a plate having an upwardly extending flange, includes an angle iron having an upwardly extending flange in a spaced apart parallel condition to the flange of the base plate so as to form the slot. Preferably, a bolt extends upwardly from the underside (i.e, bottom surface) of the base member and through the chair frame holder. Receivable on the threaded shank of the bolt is an easily rotatable wing nut 109 for urging the chair frame holder 112 into clasping engagement with a portion of a chair frame received in the slot 114 of the base member 110, for clasping the chair to the seat mounting assembly 22. Other supplemental hardware, such as washers and the like, is used in a traditional way to complete the chair clamp portion of the seat mounting assembly.

To adjust the seat 100 of the recumbent bicycles 6a, 6b for proper pedal engagement, the wing nuts 109 of each channel clamp portion 106 of the front and rear brackets 102 are loosened such that the seat 100 may be slid, forwardly or rearwardly with respect to the pedals 72, within the channel 56 of the top tube 50. Upon achieving a comfortable "fit", the wing nuts 109 are tightened to secure the mounting assembly 22, and the chair 100 thereby, in place. When transporting the recumbent bicycle, or otherwise desiring to remove the seat for other purposes, the wing nuts of the chair clamp portion only need be loosened so as to free those portions of the seat frame captured thereby. As the position of the channel clamp portion remains unchanged, no additional adjustments are necessary when desiring to resume riding activities once the seat has been reattached.

The steering mechanism 24 of the recumbent bicycle is configured to indirectly manipulate the steerer tube 29 of the front frame portion 14 (i.e., the body) of the recumbent bicycle frame 12. The steering mechanism 24 generally includes a steering bend 120, a supplemental stem 122, and a push rod 124 for connecting the steering bend 120 to the supplemental stem 122, such that a partial turning of the supplemental stem 122 effectuates a corresponding partial turning of the steerer tube 29 of the forward frame portion 14.

As best seen in FIGS. 1 & 2, the steering bend 120 is supported by the stem 31 of the sit-up frame 14 (i.e., the bend 120 is preferably substituted for the handlebar assembly 140), in a known fashion. The "sweep" of the bend 120, and angular deployment of the bend 120 in the "old" stem 31 relative to the horizon can be variable, depending in large part on the specific geometric configuration of the forward frame portion 14 (e.g., angle of the seat tube and/or head tube, etc.), as well as contingent upon the height/arm length of the rider (i.e., height of the handlebar assembly 140 relative to the head tube). A bearing stud 126 is carried by the steering bend 120 to receive a spherical bearing 128 positioned at an end of the push rod 124, with a bearing stud end nut 130 securing the push rod 124, at one end, to the steering bend 120.

The supplemental stem 122 is rotatably affixed to a seat post 35 which is received in the seat tube 34 of the front frame portion 14, and secured therein with a conventional seat post clamp. The seat post 35 is adapted to carry upper and lower stem bearings 132 and a cage 134 for holding a water bottle, such location being ideal for easy rider access. The supplemental or "new" stem 122 is equipped with a pair of apertured ears or flanges 136, positioned for mating with the bearings 132 of the seat post 35. The ears 136 are alignable so as to register with the seat bearings 132, and are joined to the seat bearings 132 by an axle bolt and nut 138 so as to connect the supplemental stem 122 to the seat post 35 for rotation with respect thereto.

An otherwise conventional handlebar assembly 140 (e.g., the assembly for which the steering bend 120 is substituted in the "old" stem 31) has a push rod mounting assembly or receiver 142 generally including a handlebar clamp 144 adapted to fasten to the handlebar 146 of the handlebar assembly 140, and a bearing stud 126 for supporting the forward end of the push rod 124. A bearing stud 126 receives a spherical bearing 128 positioned at the forward end of the push rod 124, with a bearing stud end nut 130 securing the forward end of the push rod 124 to the handlebar 146 of the handlebar assembly 140. As is readily apparent from the above description and accompanying figures, manipulation of the handle bar 146 supported by the "new" stem 122 correspondingly manipulates the steerer tube 29 of the forward frame portion 14 to effectuate precise turning for the recumbent bicycles 6a, 6b of the subject invention.

In order to structurally interconnect the recumbent bicycles 6a, 6b, a pair of braces or brace members 148 are preferably used, as shown in FIGS. 2 and 3. These brace members, which are part of the bracing assembly 8 which also includes forward 150 and rearward 152 frame attaching assemblies (i.e., brace mounting assemblies), operate to structurally connect or unite the frames 12a, 12b of the two bicycles 6a, 6b. The braces 148 constrain the companion bicycles in six degrees of motion: pitch, roll, yaw, lateral side to side, lateral fore and aft, and lateral up and down.

It is preferable that little flexibility be provided vis-a-vis the brace members 148 so the dual recumbent vehicle 5 will have both the look and feel of a single unit, rather than simply two independent bicycles joined together. Further, it is advantageous that the brace members 148 be quickly and easily connected and disconnected to each of the bicycle frames 12, as by the attaching or bracing assemblies 8, preferably without the need for any tools, let alone specialized tools. This enables users to convert the bicycles 6a and 6b from independent units to a single dual recumbent vehicle 5, and vice vera, with relatively little effort.

The preferred bracing assemblies 148 are generally shown uniting the bicycles 6a and 6b in FIGS. 1–3. These brace assemblies 8 generally include front 154 and rear 156 crossbars and frame attaching assemblies 152. The crossbars, which are preferably 1.25 inch square aluminum tubing, join the head tubes 28 of the frame bodies 14 of each of the bicycles together in the front, and connect the rearward most structural frame members in the rear. More particularly, the rear crossbar 156 joins the primary seatstays 46 of the companion recumbent bicycles.

Figure 4:
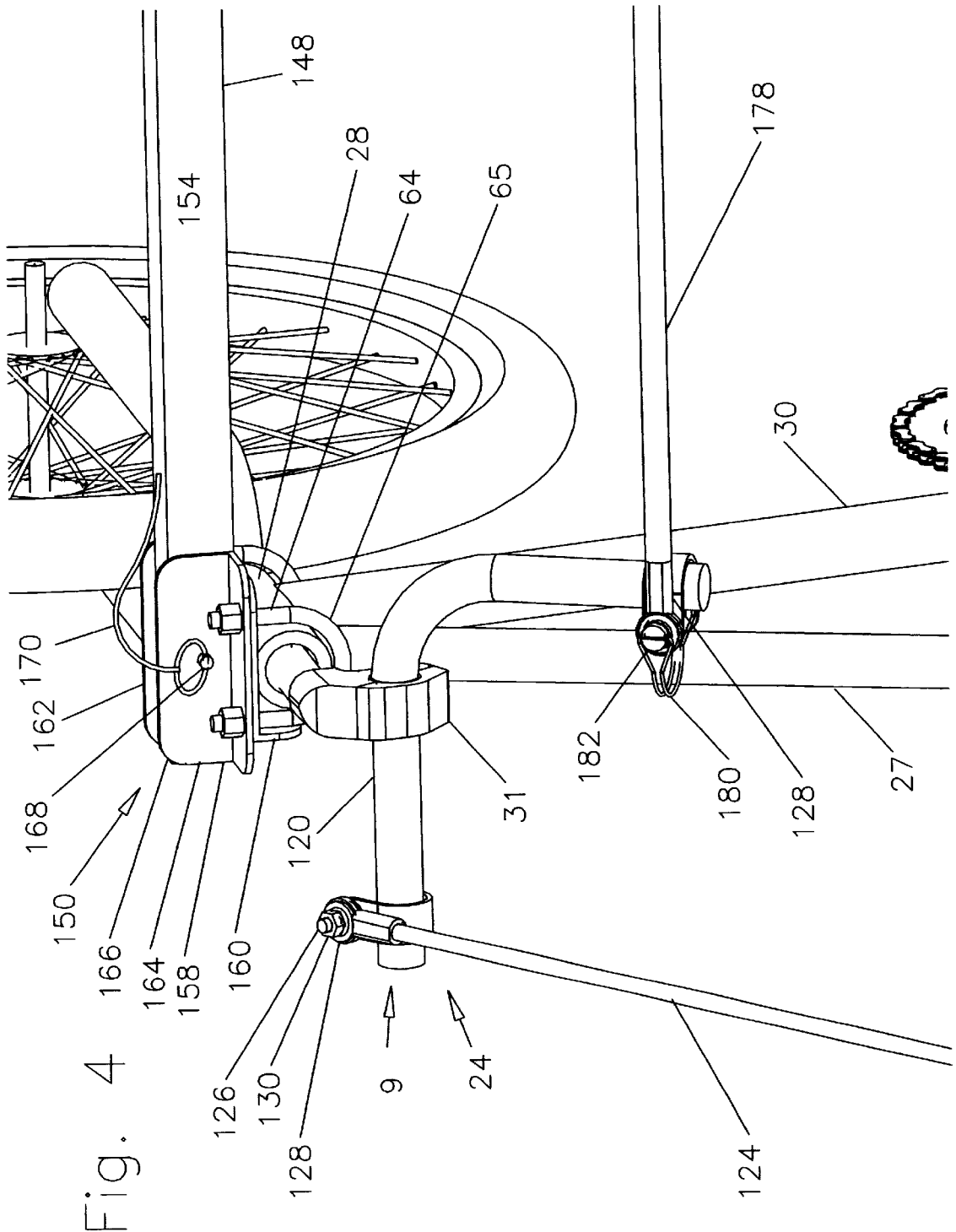
FIG. 4 is a fragmentary perspective detail view thereof taken from the area encircled at 4 in FIG. 1, shown from above and slightly to the right of the left front joining elements.

Referring now to FIGS. 2 & 4, the forward brace mounting assembly 150 includes a front crossbar bracket 158 having a bolster 160, spaced apart upper and lower bracket portions 162, and frame mounting hardware for mechanically fastening the bracket (i.e., the elements thereof) to the head tube. More particularly, "U" bolts 64 embrace the head tube 28 above and below the union of the top tube 27 and down tube 30 therewith, and retain the bolster 160 against the head tube 28, as well as the upper and lower bracket portions 162 in a spaced apart condition against the bolster 160. As the bend of the "U"-bolts 64 snugly embrace the head tube 28 of the forward frame portion 14 of the bicycles 6a, 6b, a segment of polyethylene tubing is provided about the bend to generally prevent direct contact therebetween, thus protecting the surface finish of the head tube 28.

Figure 6:
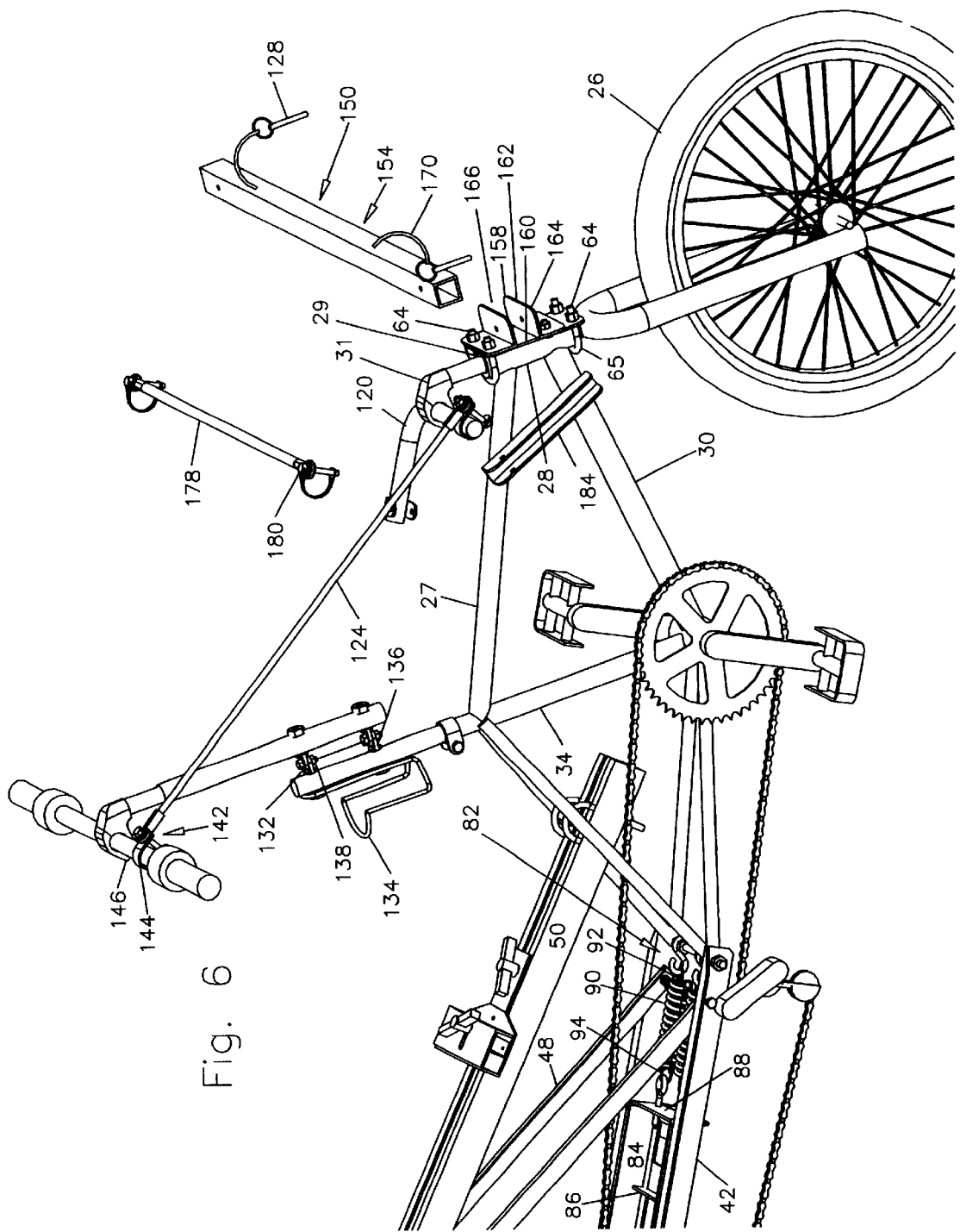
FIG. 6 is a fragmentary perspective detail of the right recumbent bicycle prior to joining showing joining elements in part.

The upper and lower bracket portions 162 are preferably angle irons or equally suitable flanged elements. As best seen in FIG. 6, they are arranged relative to the head tube 28 such that the flanges 164 of each portion are substantially perpendicular thereto, and parallel to each other. The bracket portions 162, in combination with the bolster 160, define a brace receiving channel 166 for the forward frame attachment assembly 150. As best seen in FIG. 4, the channel 166 captures the forward crossbar 154 on three sides. Both the crossbar 154 and the bracket portions 162 are adapted to receive a drift pin 168 so as to secure the former to the later. The drift pin 168 preferably has a ball detent 169 to effectuate a secure placement, and is anchored to the frame or crossbar 154, as by a tether strap 170, to avoid loss or misplacement during conversion from, or to, the recumbent vehicle 5 of the subject invention. As will be readily appreciated, this structure and arrangement of components provides a supremely quick and easy union of the companion bicycles, one which requires no tools, and only a basic mechanical aptitude.

Referring now to FIG. 5, the rearward brace mounting assembly 152 includes a rear crossbar bracket 172 having spaced apart upper and lower flanges 174 which define a brace receiving channel 176 for the rearward frame attachment assembly 152. The rear bracket 172 is joined to the primary seatstays 46, at a position below the top tube 50 of the rearward frame portion 16 of the recumbent bicycles 6a, 6b. The bracket 172 preferably has a contoured or profiled lower edge that accommodates the travel distance of the rear ground engaging wheel 20 which is suspendingly supported by the suspension assembly 18 of the individual bicycle 6a, 6b, a feature heretofore unseen in a recumbent bicycle, let alone in a dual recumbent vehicle. As in the forward brace mounting assembly 150, the rear bracket 172 and rear crossbar 156 are both adapted to receive tethered drift pins 168 as shown in FIG. 5.

The steering coupler assembly 9 integrates the individual steering mechanisms 24 of each of the recumbent bicycles 6a, 6b so as to provide "Ackermann" geometrically correct steering for the vehicle, so that in (i.e., during) a turn, the inside wheel will turn at an increased angle in relation to the outside wheel. This makes the vehicle turn smoother without unnatural side loading the front wheels.

Referring now to FIGS. 2 and 4, the steering coupler assembly 9 generally includes a tie rod 178 for linking the steering bends 120 of the individual recumbent bicycles. The tie rod 178 is adapted to be fixedly received by the steering bends 120, more particularly, the opposing ends of the tie rod 178 support spherical bearings 128 which are directly attached to the steering bend 120, as by a cotter 180 received through the bearing 128 and an end of the steering bend 120, and reversibly secured thereto using a pin 182 or the like, thus permitting quick connecting and disconnecting.

As it is quite inefficient and unsafe to have steering conducted by two riders, one of the push rods 124 of the paired recumbent bicycles is disconnected to render steering of that bicycle inactive. The freed end of the push rod 124 is anchored or attached to a stationary (i.e., parking) bracket 184 with a locking drift pin 168 of the style used to secure the crossbars 154, 156 to the frame attaching assemblies 150, 152. This is preferably, but not necessarily, the bike on the right in FIG. 2. With this arrangement, the left or "captain" bike would have steering control of the vehicle, and the passenger handle bar assembly would permit independent shifting and braking while providing a secure hand hold, but would not in any way contribute to steering of the vehicle.

Figure 8:
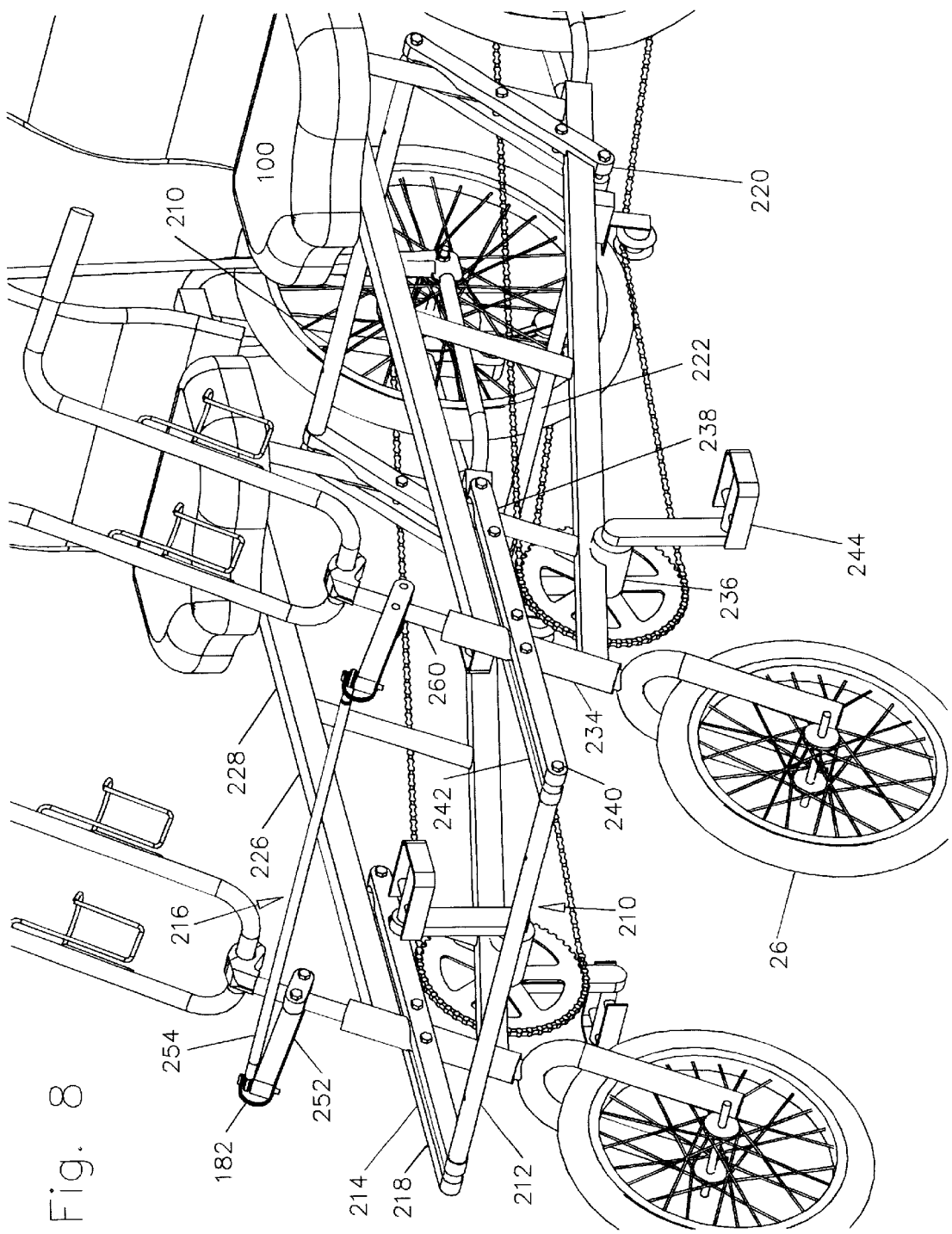
FIG. 8 is a partial view of the recumbent vehicle of FIG. 7, particularly illustrating forward bracing and steering details; and, FIG. 9 is a partial view of the recumbent vehicle of FIG. 7, particularly illustrating rearward bracing details.
Figure 9:
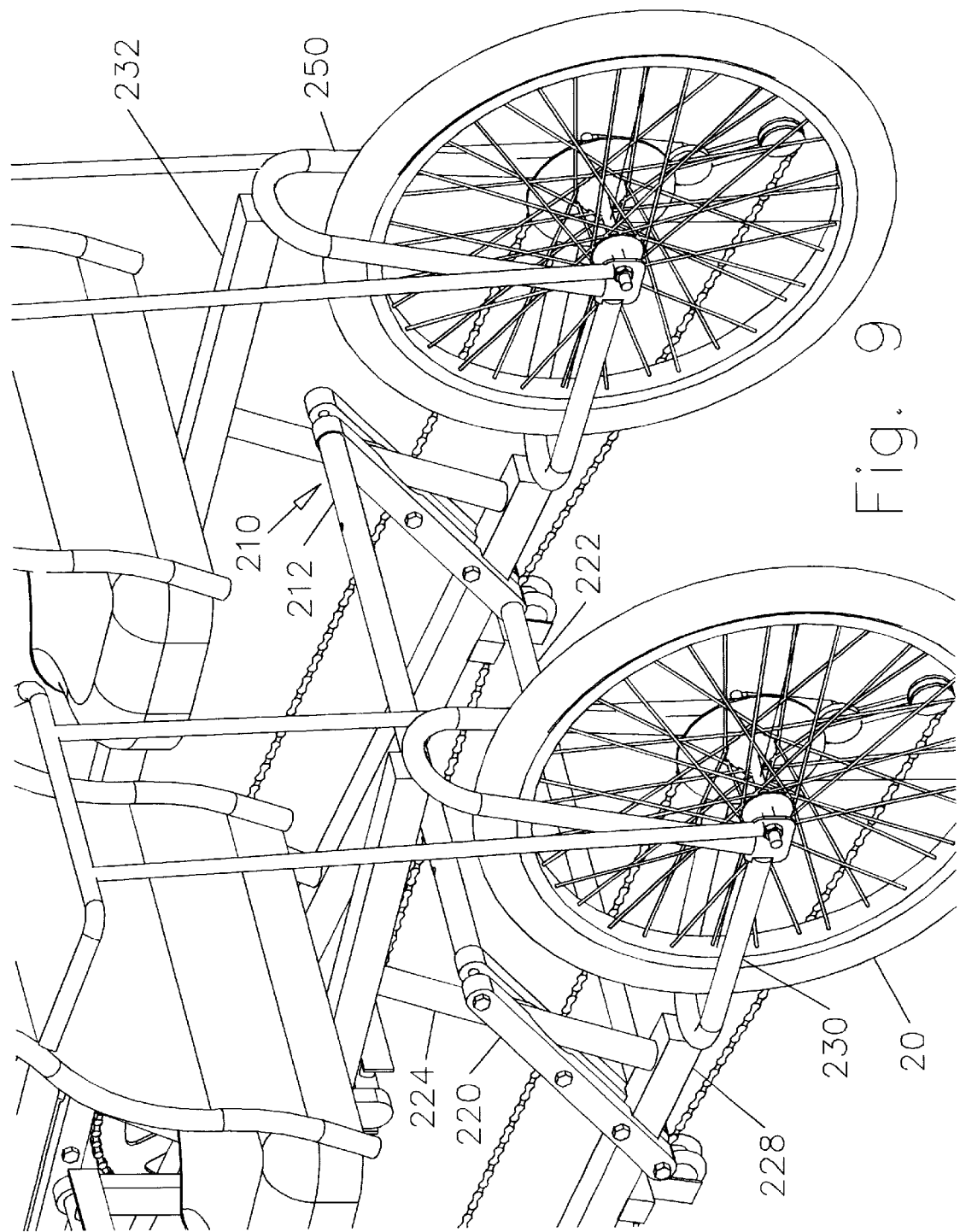

Referring now to the recumbent vehicle of FIGS. 7–9, there is shown a pair of recumbent bicycles 200a, 200b, each characterized as having a traditional diamond frame, more particularly there is shown integrated EZ-1 Super Cruzer recumbent bicycles from Easy Racers Inc., Freedom, Calif. 95019. The paired recumbent bicycles 200a, 200b are operatively and reversibly united so as to form the recumbent vehicle 5 of the subject invention using components of a kit, namely a bracing assembly 210 which includes a pair of braces 212, brackets 214 adapted to reversibly receive portions of the braces 212 therein, and a steering coupler assembly 216. In the discussion that follows, focus is placed upon those parts, structures or features not in common with the recumbent vehicle heretofore described, with like numbering of references referring to like parts in the several figures herewith.

The bracing assembly 210 generally includes a pair of braces 212, more particularly forward 218 and rearward 220 braces which are reversibly received in, or mounted on, forward and rearward brackets. The bracing assembly 210 constrains the parallel paired recumbent bicycles in six degrees of motion, namely pitch, roll, yaw, lateral side to side, lateral fore and aft, and lateral up and down. An intermediate spacer 222 is further, and optionally, provided, such feature being primarily dictated by frame geometry. As shown in FIGS. 7–9, the spacer 222 is positioned adjacent, and forward of, the seat tube 224.

As best seen in FIGS. 8 and 9, the front bracket 218 is preferably supported by a front triangle 226 of the diamond frame 228 (FIG. 8), with the rear bracket 220 being supported by a rear triangle 230 of the diamond frame 228 (FIG. 9). More particularly, the front bracket 218 is affixed (i.e., anchored) to the top tube 232, however, the head tube 234 is preferable for supporting same, to the extent the frame geometry permits operative placement thereof (e.g., receipt of the forward bracket 218 on the head tube 234 of the frame 228 depicted in FIGS. 7–9 is mechanically less desirable than placement on the top tube 232, as the forward bracket 218 is required to be forwardly extending to allow meaningful pedaling clearance (i.e., due to the proximity of the bottom bracket 236 to the head tube 234, an arrangement as shown in FIGS. 1–4, and 6, namely a stub bracket 158, is not permitted for the frame style of FIGS. 7–9)).

The front bracket 218, as best seen with reference to FIG. 8, generally comprises a frame engaging or anchoring portion 238 and a brace engaging or anchoring portion 240, the frame 238 and brace 240 portions being carried on opposing ends of spaced apart arms 242. The frame anchoring portion 238 is affixable in a known way to the top tube 232 at a position adjacent the head tube 234. The spaced apart arms 242 forwardly extend, one on each side of the head tube 234, so as to position the forward brace member 212 sufficiently forward of the cranks 244 to permit pedaling of the recumbent vehicle 5. Quick release drift pins 168 reversibly link the forward brace 212 with the brace anchor 240, the general interface of the brace 212 with the front bracket 218 preferably being consistent with that previously described, although alternate arrangements may be employed (e.g., plates, angles irons, fastening hardaware, etc.) without deviating from the scope of the subject invention.

The rear bracket or brace mount 220, as best seen with reference to FIG. 9, has a spaced apart upper and lower flanges 246 which define a brace receiving channel 248. The rear bracket 212 is joined to the seatstay 250 of the rear triangle 230 of the diamond frame 228, with this portion of the bracing assembly 210 being substantially equivalent to that heretofore discussed.

The steering coupler assembly 216, as best seen with reference to FIG. 8, includes a pair of steering arms 252 (i.e., one for each of the pair recumbent bicycles) and a tie rod 254. The steering arms 252 are joined to the handle bar assembly 256 of each of the recumbent bicycles 200a, 200b using mounting hardware comprising plates, bolts, nuts, etc. in a known way. As shown in the figures, the steering arms 252 preferably, but not necessarily, depend from the bar 258 of the handle bar assembly 256 and extend forward thereof. Although the mechanics of this arrangement are generally superior to anchoring the steering coupler assembly 216 to the stem 260 thereof, it is not the exclusive anchoring arrangement. The steering arms 252 are preferably of a box beam construct, the tie rod 254 being secured at the free ends thereof using lynch pins, preferably tab or wire lock pins.

While a preferred embodiment of the present invention has been described, it should be understood that various changes, adaptations and modifications may be made therein without departing from the spirit of the invention. Changes may be made in details, particularly in matters of shape, size, material, and arrangement of parts without exceeding the scope of the invention. Accordingly, the scope of the invention is as defined in the language of the appended claims.

What is claimed is:

1. A recumbent vehicle comprising parallel paired recumbent bicycles operatively and reversibly joined by a bracing assembly comprising forward and rearward bracing members which constrain said parallel paired recumbent bicycles in six degrees of motion, each of said parallel paired recumbent bicycles comprising a diamond frame, said diamond frame including a front triangle from which extends a rear triangle, said front triangle having a top tube adapted to receive a portion of said forward bracing member, said rear triangle having seatstays adapted to receive a portion of said rearward bracing member, said bracing assembly further including front and rear brackets for reversibly receiving said bracing members, said front bracket being supported by said top tube, said rear bracket being supported by said seat stays.

2. The recumbent vehicle of claim 1 wherein said bracing assembly further includes quick release pins operatively joining said bracing members to said brackets.

3. The recumbent vehicle of claim 2 wherein said parallel paired recumbent bicycles are capable of being independently powered while operatively joined by said bracing assembly.

4. The recumbent vehicle of claim 3 further comprising a steering coupler assembly, said steering coupler assembly adapted to receive individual steering mechanisms of each of said parallel paired recumbent bicycles so as to provide geometrically correct steering for said vehicle.

5. The recumbent vehicle of claim 4, wherein each of said parallel paired recumbent bicycles includes a seat adapted to at least partially support a canopy.

6. A recumbent vehicle comprising parallel paired recumbent bicycles operatively and reversibly joined by a bracing assembly comprising forward and rearward bracing members, each of said parallel paired bicycles including a frame having joined forward and rearward frame portions, said forward frame portion having a front triangle from which extends a rear triangle, a portion of said forward bracing member being receivable by a head tube of said forward frame portion, said rearward bracing member being receivable by said rearward frame portion, said bracing assembly further including front and rear brackets for reversibly receiving said bracing members, said front bracket being supported by said head tube.

7. The recumbent vehicle of claim 6 wherein each of said parallel paired recumbent bicycles includes a suspension assembly for at least partially suspending a ground engaging wheel thereof.

8. The recumbent vehicle of claim 7 wherein said suspension assembly is operatively interposed between said front and rear frame portions.

9. A conversion kit for reversibly uniting a pair of recumbent bicycles so as to form a recumbent quad, each of the recumbent bicycles comprising a diamond frame, said conversion kit comprising, a bracing assembly including a pair of box beams and brackets adapted to reversibly receive portions of said box beams therein, one of said brackets being a front bracket, another of said brackets being a rear bracket, said front bracket being supported by a front triangle of the diamond frame, said rear bracket being supported by a rear triangle of the diamond frame, hand operable pins for reversibly joining said box beams to said brackets, and a steering coupler assembly comprising a tie rod and mounting hardware, said mounting hardware being operatively supported on stems of handle bar assemblies of each of the recumbent bicycles, said tie rod thereby joining the handle bar assemblies of each of the recumbent bicycles to effectuate geometrically correct steering for the recumbent quad.

10. A recumbent vehicle comprising parallel paired recumbent bicycles operatively and reversibly joined by a bracing assembly, each of said parallel paired recumbent bicycles including forward and rearward triangular frame portions, corresponding forward and rearward triangular frame portions of said parallel paired recumbent bicycles being linked by bracing members of said bracing assembly, said bracing members constraining said parallel paired recumbent bicycles in six degrees of motion, said forward triangular frame portion including a top tube adapted to receive a portion of one of said bracing members, said rearward triangular frame portion including seatstays adapted to receive a portion of one of said bracing members, said bracing assembly further including front and rear brackets for reversibly receiving said bracing members, said front bracket being supported by said top tube, said rear bracket being supported by said seat stays.

11. The recumbent vehicle of claim 10 wherein said bracing assembly further includes quick release pins operatively joining said bracing members to said brackets.

12. The recumbent vehicle of claim 11 further comprising a steering coupler assembly, said steering coupler assembly adapted to receive individual steering mechanisms of each of said parallel paired recumbent bicycles so as to provide geometrically correct steering for said vehicle.

13. The recumbent vehicle of claim 12 wherein each of said parallel paired recumbent bicycles includes a seat adapted to at least partially support a canopy.

14. The recumbent vehicle of claim 13 wherein each of said parallel paired recumbent bicycles includes a suspension assembly for at least partially suspending a ground engaging wheel thereof.

* * * * *